Aug. 8, 1950   R. H. GOODARD   2,518,001
RING VALVE CONSTRUCTION FOR COMBUSTION CHAMBERS
Filed July 26, 1946   2 Sheets-Sheet 1
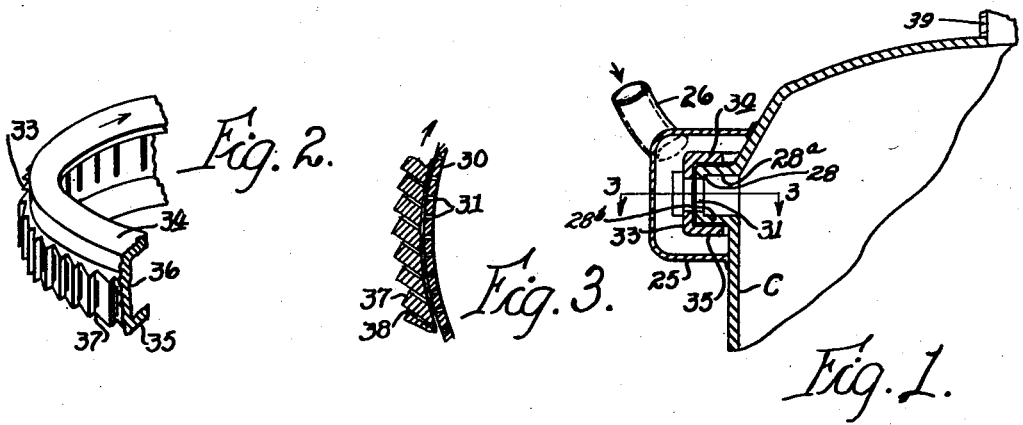
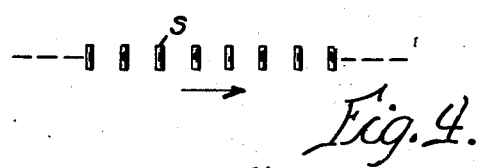
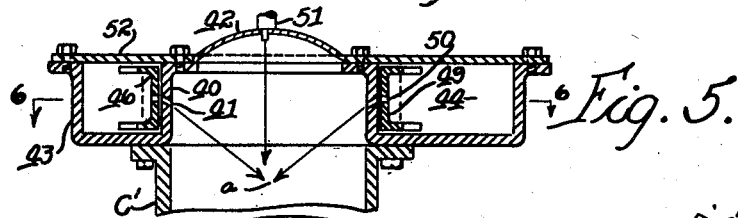
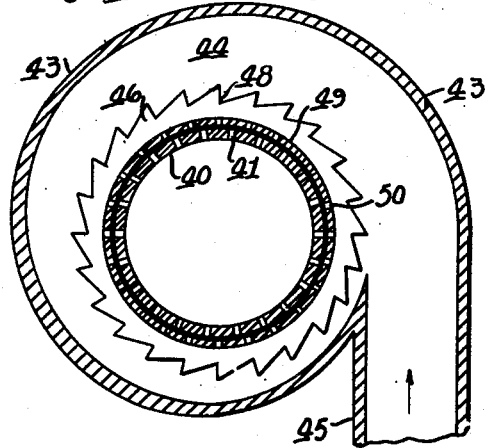
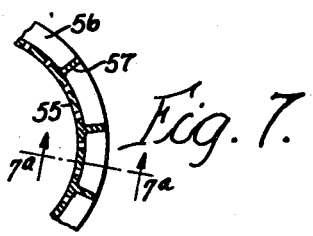
Inventor.
Robert H. Goddard, Dec'd.
Esther C. Goddard, Executrix
By Chas. T. Hawley
ATTY.

Aug. 8, 1950  R. H. GODDARD  2,518,001
RING VALVE CONSTRUCTION FOR COMBUSTION CHAMBERS
Filed July 26, 1946  2 Sheets-Sheet 2
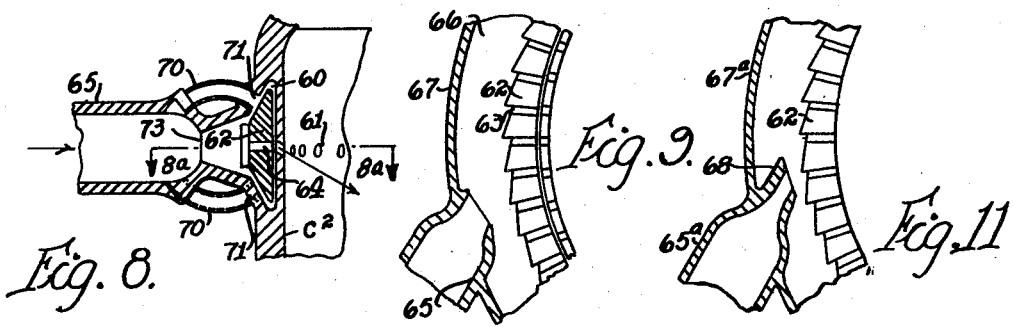
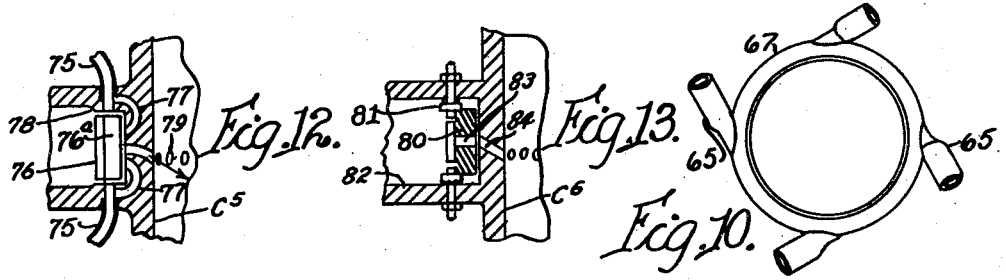
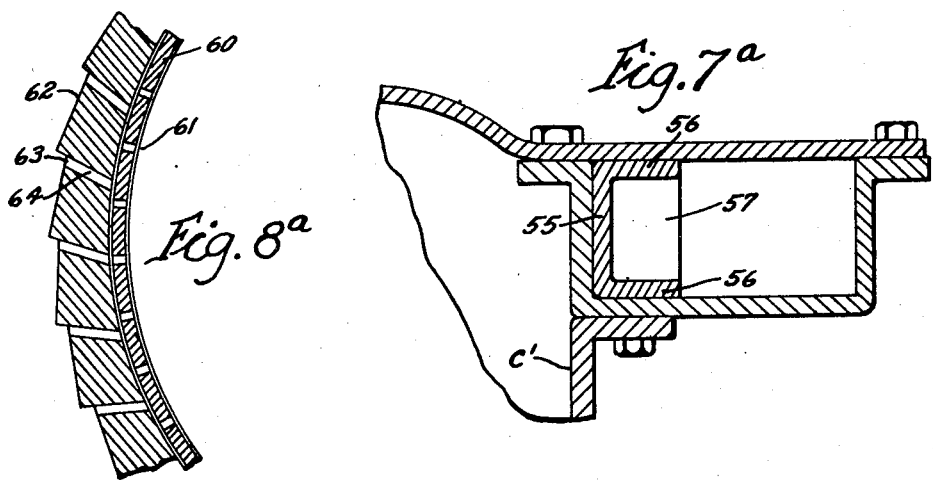
Inventor.
Robert H. Goddard, Dec'd.
Esther C. Goddard, Executrix
By Chas. T. Hawley
ATTY.

Patented Aug. 8, 1950

2,518,001

UNITED STATES PATENT OFFICE 2,518,001

RING VALVE CONSTRUCTION FOR COMBUSTION CHAMBERS

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application July 26, 1946, Serial No. 686,388

9 Claims. (Cl. 60—44)

This invention relates to combustion chambers to which one or both combustion liquids are fed as a rapid succession of separated slugs. Such combustion chambers are adapted for use in aerial propulsion apparatus including rockets and rocket craft.

It is the object of the invention to provide improved ring valves to effect such intermittent feed of one or more combustion liquids.

A further object is to provide a ring valve for such purposes which is of simple and inexpensive construction but reliable and efficient in operation.

Another object is to provide a ring valve which requires no special starting means and which is sealed by the combustion liquids when in operation. A construction is also provided by which a single ring valve can control the admission of two different combustion liquids.

The invention further relates to arrangements and combinations of parts which will be hereinafter described and more particularly pointed out in the appended claims.

Preferred forms of the invention are shown in the drawings, in which:

Fig. 1 is a partial sectional elevation of a combustion chamber to which the improved ring valve has been applied;

Fig. 2 is a partial perspective view of the valve;

Fig. 3 is a sectional plan view of certain parts, taken along the line 3—3 in Fig. 1;

Fig. 4 is a diagrammatic view to be explained;

Fig. 5 is a partial sectional elevation of a modified form of the invention;

Fig. 6 is a sectional plan view, taken along the line 6—6 in Fig. 5;

Fig. 7 is a partial sectional plan view of a modified construction of the ring valve shown in Fig. 6;

Fig. 7a is a detail sectional view, taken along the line 7a—7a in Fig. 7;

Fig. 8 is a partial sectional elevation of another ring valve construction providing balanced forces to center the ring valve vertically;

Fig. 8a is a detail sectional view, taken along the line 8a—8a in Fig. 8;

Fig. 9 is a sectional plan view of the construction shown in Fig. 8;

Fig. 10 is a plan view of the casing used in the construction shown in Figs. 8 and 9;

Fig. 11 is a view similar to Fig. 9 but showing a modified feed arrangement; and Figs. 12 and 13 are partial sectional elevations similar to Fig. 8 but showing additional modifications.

Referring to Figs. 1 to 4, a combustion chamber C is shown which is provided with an annular casing 25 to which a combustion liquid is fed tangentially through a supply pipe 26. The chamber C has an annular projection 28 near the closed end of the chamber and this projection comprises upper and lower flanges 28a and 28b joined by a cylindrical portion 30 having a plurality of admission ports or slots 31. An annular valve member 33 surrounds and is loosely rotatable on the fixed annular projection 28 of the combustion chamber C.

The valve member 33 has upper and lower flanges 34 and 35 which embrace the upper end lower flanges of the projection 28, with slight or running clearance. The middle portion 36 of the ring valve is formed to provide peripheral notches 37 (Fig. 3) and is also provided with slotted port openings 38 which are preferably substantially inclined outwardly in the direction of rotation.

As liquid under pressure is supplied through the tangential feed pipe 26, the liquid flows around the passage formed by the annular casing 25 and engages the ring valve 33 in the notches 37 in such manner as to rotate the ring valve at a desired speed, which speed may be controlled by varying the feed pressure.

Each time the feed openings 38 come into alignment with the ports 31 in the portion 30 of the chamber wall, small portions or slugs of the combustion liquid will be injected into the combustion chamber C, the relative spacing of successive slugs S admitted through any one port 31 being as indicated diagrammatically in Fig. 4.

The other combustion liquid may be admitted through an axial feed pipe 39, or in any other desired manner.

This construction has several important advantages, among which is the fact that the ring valve 33 rotates on a thin film of liquid which is interposed in the running clearance between the ring valves 33 and the chamber projection 28. Furthermore, the ring valve begins to rotate as soon as liquid under pressure is admitted tangentially through the feed pipe 26, and no special starting devices are required.

By rotating the valve member at relatively high speed and by providing a multiplicity of port openings as indicated in Fig. 3, a very large number of separated slugs of the combustion liquid are admitted to the combustion chamber in a very short period of time, so that the advantages of substantially continuous combustion are attained, together with improved and more complete mixing, due to the admission of the combustion liquid as a series of separated slugs.

A somewhat similar construction is shown in Figs. 5 and 6, in which a combustion chamber C' supports an end member 40 having ports 41 inclined to direct the separated slugs to a common point a substantially removed inward from the arched end 42 of the combustion chamber.

The end member 40 has an outer casing 43 providing a volute passage 44 receiving a combustion liquid tangentially through a feed pipe 45 (Fig. 6). An annular valve member 46 is loosely rotatable on the extension 40 of the chamber C', and the upper and lower flanges of the valve member 46 are notched as indicated at 48 in Fig. 6. The cylindrical connecting portion 49 of the valve member 46 is provided with ports 50 which coact with the ports 41 in the extension 40, as previously described in connection with Figs. 1 to 3.

The sprays of separated slugs of one liquid converge at the point a, and the other liquid may be introduced through an axial feed pipe 51 in a continuous spray, also directed to the point a.

The arched end 42 of the combustion chamber may be formed integral with a cover plate 52 which closes the upper side of the volute 44.

In place of the notched flanges shown in Figs. 5 and 6, a ring valve member 55 (Fig. 7) may be provided, having circular top and bottom flanges 56 and with connecting webs or partitions 57 against which the liquid rotating in the volute passage 44 may operate to rotate the valve 55.

In the constructions shown in Figs. 1 to 7 and as previously described, the number of port openings may be the same in the rotating and stationary parts as indicated in Fig. 3, or may differ by some small number as indicated in Fig. 6. If the two series of ports differ by two ports, then opposite ports will be open at the same time and the ports on a diameter at right angles to the diameter of the open ports will be closed, so that the pressures will always be accurately balanced on the rotating valve member, and so that at least two pairs of ports will always be at least partially open in every angular position of the rotating member. Consequently, fully continuous combustion will be effectively maintained, while at the same time the forces acting on the rotating valve member are continuously balanced.

The valve members thus far described are to a considerable extent self-centering, as vertical shifting of the rotating valve member tends to increase the clearance at one side and to decrease the clearance at the other side. This change in clearances promptly results in an increase in pressure in the restricted portion, which increase in pressure tends to shift the rotating ring back to central position with uniform clearance.

In Figs. 8, 8a, 9 and 10, a construction is shown in which special provision is made for centering the ring valve. In this construction, a combustion chamber C2 is provided with an annular recess 60 and with a plurality of inlet ports 61. A ring valve 62 rotates freely in the recess 60 and is provided with notches 63 and port openings 64.

A combustion liquid is supplied through feed pipes 65 (Fig. 10) to an annular passage 66 (Fig. 9) enclosed by a casing 67. The feed pipes 65 are tangentially disposed as indicated in Fig. 10, and are preferably mounted in a desired number of balanced pairs as shown.

If it is desired to rotate the valve member 62 at unusually high speed, the feed pipe 65a (Fig. 11) may be extended inside of the casing 67a to provide a restricted nozzle 68 through which the liquid under pressure will be injected at greater speed and closer to the ring valve 62. The construction differs from that shown in Figs. 8 and 9 only by the inward projection of the nozzle 68.

At spaced intervals about the passage 66 (Fig. 9) branch feed pipes 70 (Fig. 8) conduct a portion of the liquid under pressure in the feed pipes 65 to ports 71 adjacent the beveled upper and lower annular surfaces of the ring valve 62.

Such pressure, applied through the pipes 70 against the inclined surfaces of the ring valve, act to center the ring valve vertically and to correct displacement from such central position by increase in pressure in the clearance space toward which the valve tends to be displaced.

The branch pipes 70 are preferably connected into each supply pipe 65 at a point just outside of the restricted opening 73 connecting the pipe 65 into the annular passage 66. As thus connected, the pressure in the branch pipes 70 is commonly slightly greater than the pressure in the annular passage 66.

A somewhat similar result is attained in the construction shown in Fig. 12 in which branch pipes 75 apply pressure to the upper and lower surfaces of the ring valve member 76, which is rotatably mounted in an annular recess 78 surrounding the combustion chamber C5. The fuel enters the combustion chamber through slots 76a and port openings 79 and auxiliary branch passages 77 apply pressure against the inner face of the ring valve member 76. If this valve member 76 is displaced either vertically or in a horizontal plane, the decrease in clearance will cause a corresponding incease in pressure which will quickly correct the displacement.

In the construction shown in Fig. 13, the ring valve 80 rotates in an annular recess 82 surrounding the combustion chamber C6, and fuel is fed through slots 83 and port openings 84. Displacement of the ring valve member 80 is positively prevented by rollers 81 engaging the upper, lower and outer surfaces of the ring valve member.

Having thus described the invention and the advantages thereof, it will be understood that the invention is not to be limited to the details herein disclosed, otherwise than as set forth in the claims, but what is claimed is:

1. In combustion apparatus, a casing defining a combustion chamber and having an annular portion with a plurality of port openings, and a ring valve mechanism comprising a ring valve member mounted to rotate outside of said annular portion and also having port openings, and means to rotate said valve member by the direct action of the combustion liquid supplied under pressure thereto.

2. In combustion apparatus, a casing defining a combustion chamber and having an annular portion with a plurality of port openings, and a ring valve mechanism comprising a ring valve member mounted to rotate outside of said annular portion and also having port openings, and means to rotate said valve member by the direct action of the combustion liquid supplied under pressure thereto, said valve member rotating in an annular admission passage to which said combustion liquid is supplied substantially tangentially.

3. The combination in combustion apparatus as set forth in claim 2, in which the ring valve member has a plurality of peripheral notches engaged by said combustion liquid.

4. The combination in combustion apparatus as set forth in claim 2, in which the port openings in said ring valve member are outwardly inclined in the direction of rotation of said valve member.

5. In combustion apparatus, a casing defining a combustion chamber and provided with a hollow and inwardly open peripheral portion of U-shaped cross section about its closed end, an inwardly open annular valve member of U-shaped cross section rotatable on said peripheral portion, said peripheral portion and said member having coacting port openings, a casing loosely enclosing said valve member, means to supply a combustion liquid under pressure to said casing, and means to rotate said valve member.

6. In combustion apparatus, a casing defining a combustion chamber and having admission ports about its closed end directed to a focus substantially removed axially from said end, an annular valve member of U-shaped cross section rotatable on said combustion chamber, a volute enclosing said valve member and having a tangential intake for combustion liquid, and devices on said valve member engageable with and rotated by said combustion liquid.

7. The combination in a combustion chamber as set forth in claim 6, in which the liquid-engaged devices on the valve member comprise peripheral notches in the upper and lower flanges of the annular valve member.

8. A ring valve mechanism for a combustion chamber comprising a casing, said mechanism having an annular portion with a plurality of port openings, said mechanism comprising a ring valve member mounted to rotate outside of said annular portion and having substantially conical upper and lower outer surfaces and having a plurality of port openings through its middle portion, means to supply a combustion liquid under pressure to said port openings, and branch means to apply balancing liquid pressures to said upper and lower conical surfaces.

9. The combination in a ring valve mechanism as set forth in claim 1, in which the number of port openings in the valve member differs by two from the number of port openings in the annular portion of the combustion chamber.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,310,301 | Sherman | July 15, 1919 |
| 1,505,451 | Wall | Aug. 19, 1924 |
| 1,658,360 | Storle | Feb. 7, 1928 |

FOREIGN PATENTS

| Number | Country | Date |
|---|---|---|
| 293,186 | Great Britain | July 5, 1928 |
| 673,438 | France | Jan. 15, 1930 |